United States Patent
Nanba (10) Patent No.: US 7,133,330 B2
(45) Date of Patent: Nov. 7, 2006

(54) MAGNETO-OPTICAL RECORDING APPARATUS HAVING RECOVERY PROCESSING UNIT

(75) Inventor: Yoshiyuki Nanba, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/105,846

(22) Filed: Apr. 14, 2005

(65) Prior Publication Data

US 2005/0180269 A1    Aug. 18, 2005

Related U.S. Application Data

(62) Division of application No. 09/921,523, filed on Aug. 3, 2001, now Pat. No. 6,901,034.

(30) Foreign Application Priority Data

Apr. 5, 2001    (JP) ............................. 2001-106789

(51) Int. Cl.
    *G11B 11/00*    (2006.01)
(52) U.S. Cl. ............................. 369/13.03; 369/13.42; 369/275.3
(58) Field of Classification Search ............. None
    See application file for complete search history.

(56) References Cited

U.S. PATENT DOCUMENTS

| 5,633,838 A | 5/1997 | Hirokane et al. |
| 5,666,332 A | 9/1997 | Nakayama et al. |
| 5,683,803 A | 11/1997 | Nakayama et al. |
| 5,691,072 A | 11/1997 | Izumi et al. |
| 5,747,136 A * | 5/1998 | Shono et al. ............ 369/13.03 |
| 5,818,812 A | 10/1998 | Moribe et al. |
| 5,879,822 A * | 3/1999 | Okada .................... 369/13.43 |
| 5,959,942 A | 9/1999 | Taguchi et al. |
| 5,966,350 A | 10/1999 | Tanaka et al. |
| 6,147,961 A | 11/2000 | Nagasawa et al. |
| 6,180,268 B1 | 1/2001 | Tamanoi et al. |
| 6,570,826 B1 | 5/2003 | Hosokawa |
| 6,584,066 B1 | 6/2003 | Nanba |
| 6,625,090 B1 | 9/2003 | Takeuchi et al. |

FOREIGN PATENT DOCUMENTS

| EP | 0 800 169 A2 | 10/1997 |
| EP | 0 800 169 A3 | 10/1997 |
| JP | 7-307040 | 11/1995 |
| JP | 8-147779 | 6/1996 |
| JP | 9-63136 | 3/1997 |
| JP | 2000-57646 | 2/2000 |

* cited by examiner

Primary Examiner—Tan Dinh
(74) Attorney, Agent, or Firm—Greer, Burns & Crain,Ltd.

(57) ABSTRACT

A magnetooptic recording medium has at least a recording layer for recording data and a reproducing layer for reproducing the data recorded in the recording layer onto a substrate and reproduces the data by setting a proper reproducing laser power upon reproduction. According to the magnetooptic recording medium, magnetizing directions of a buffer area, a sector address area, and a gap area which are sandwiched between data areas in which the data is recorded are uniformly magnetized in the recording direction.

8 Claims, 13 Drawing Sheets

MAGNETO-OPTICAL RECORDING APPARATUS HAVING RECOVERY PROCESSING UNIT

This is a divisional of application Ser. No. 09/921,523, filed Aug. 3, 2001 now U.S. Pat. No. 6,901,034.

BACKGROUND OF THE INVENTION

1. Field of the Invention

The invention relates to a magnetooptic recording medium for recording and reproducing information by using a laser beam and to a storing apparatus. More particularly, the invention relates to a magnetooptic recording medium for reproducing a recording mark smaller than a laser beam by a magnetically induced super resolution and to a storing apparatus.

2. Description of the Related Arts

In recent years, as an external recording medium of a computer, an optical disk has been highlighted. According to the optical disk, by forming recording pits on the submicron order onto a medium by using a laser beam, a recording capacity can be remarkably increased as compared with that of a floppy disk as a conventional external recording medium. When considering a magnetooptic disk of 3.5 inches, although the initial disk has only a capacity of 128 MB, the disk having a capacity of 1.3 GB has been realized in recent years. A magnetooptic disk of 3.5 inches having the largest capacity of 1.3 GB at present will now be described. High density recording is realized by setting a track pitch to 0.90 μm and setting a mark length to 0.38 μm and, further, by using a super resolution technique called MSR (Magnetically Induced Super Resolution). According to the MSR technique, by devising the medium side, a mark smaller than a spot diameter of the laser beam can be recorded and reproduced. By using the MSR technique, the capacity which is 10 times as large as the capacity of 128 MB of the initial disk can be realized.

Figure 1A:
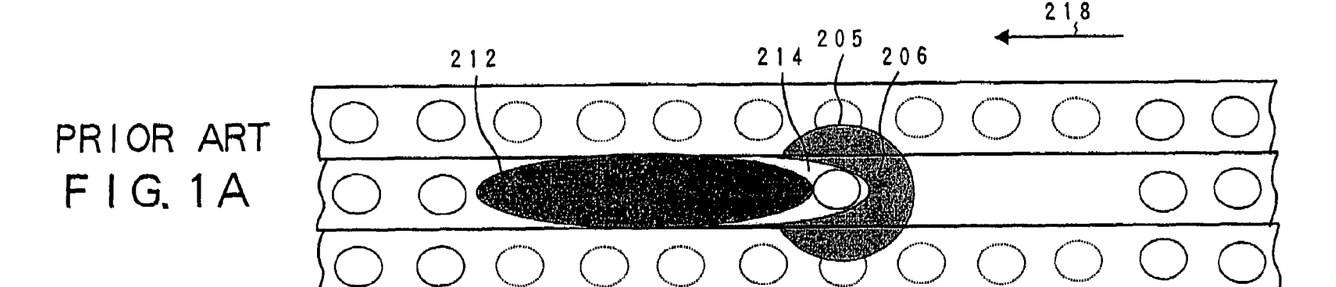
FIGS. 1A and 1B are explanatory diagrams of an MSR reproduction in a conventional medium initialized in the erasing direction.
Figure 1B:
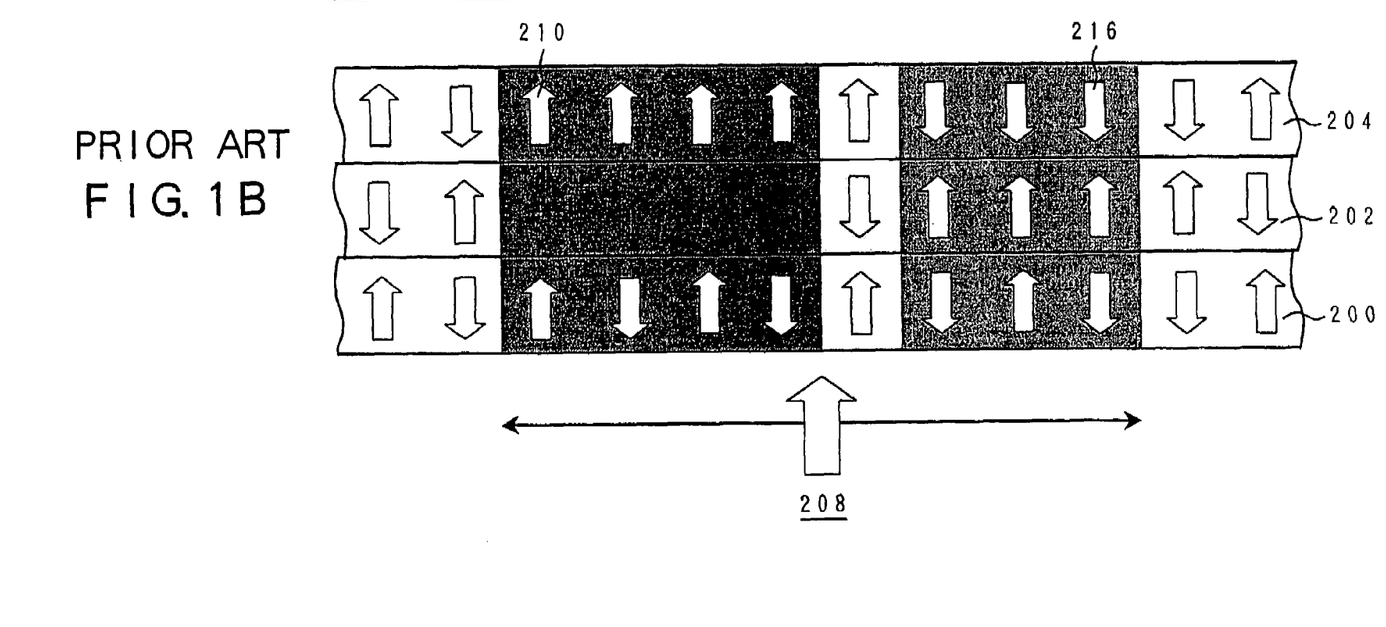

The MSR technique will now be described. FIGS. 1A and 1B are diagrams showing a reproducing principle of the MSR technique. As for a medium construction, a 3-layer construction of a recording layer 200, an intermediate layer 202, and a reproducing layer 204 will be described as an example. A mark recorded in the recording layer 200 is influenced in a low temperature portion in front of a laser beam 205 by a reproducing magnetic field, so that a front mask 206 is formed in the erasing direction. An arrow 218 indicates a medium rotating direction. In a portion behind the laser beam 205, heat generated by a reproducing power is accumulated, so that a temperature rises, a magnetization of the intermediate layer 202 is extinguished, and a rear mask 212 which faces a same recording direction 210 as that of a reproducing magnetic field 208 is formed in the reproducing layer 204. An aperture 214 is formed in an intermediate portion between the front mask 206 and rear mask 212. Only in this portion, a magnetization in the recording layer 200 is reflected to the reproducing layer 204 through the intermediate layer 202, so that the reproduction by the MSR is realized. The reproduction of the mark smaller than the laser beam 205 can be realized. The MSR technique is particularly a type called a super resolution (MSR) of the double mask type rear aperture detection system.

In case of reproducing by the MSR, it is necessary to raise the reproducing power to a power larger than that in case of the ordinary reproduction and raise a temperature of the reproducing portion. However, usually, since an ID area between data areas is formed by a pit train, there is no need to raise the reproducing power. If the reproducing power is large, a reproduction signal which is inputted to a reproducing circuit is too large and there is a possibility that it exceeds a dynamic range. It is impossible to make the reproducing power coincide with that of the MSR. Therefore, at the head of the data area where the reproduction of the MSR is executed, since the reproducing power at the time of reproducing the ID area is small, a preheating effect is not obtained and the larger reproducing power is necessary. There is, consequently, a problem such that a reproducing power margin is reduced.

According to the invention, a magnetooptic recording medium and a storing apparatus in which an enough reproducing power margin can be assured even if a reproducing power of an ID area is small are provided.

According to the invention, there is provided a magnetooptic recording medium in which at least a recording layer for recording data and a reproducing layer for reproducing the data recorded in the recording layer are formed on a substrate and the recorded data is reproduced by setting a proper reproducing laser power upon reproduction, wherein magnetizing directions of a buffer area, a sector address area, and a gap area which are sandwiched between data areas where the data is recorded are uniformly magnetized in the recording direction. According to the invention as mentioned above, by uniformly magnetizing the buffer area, sector address area, and gap area which are sandwiched between the data areas in the recording direction, the medium enters a state where an aperture and a rear mask can be formed more easily, so that a medium in which even at the head of the data area without a preheating, the reproduction by the MSR can be realized by a smaller reproducing power, and a reproducing power margin is wider can be provided.

According to the invention, there is provided a magnetooptic recording medium in which at least a recording layer for recording data and a reproducing layer for reproducing the data recorded in the recording layer are formed likewise on a substrate and the data is reproduced by setting a proper reproducing laser power upon reproduction, wherein a portion before a data area where the data is recorded is uniformly magnetized to a recording direction. That is, according to the invention, even if the portion just before the data area is merely uniformly magnetized in the recording direction instead of the whole area of a buffer area, a sector address area, and a gap area which are sandwiched between the data areas, the medium enters a state where an aperture and a rear mask can be formed more easily. A medium in which even at the head of the data area without a preheating, the reproduction by the MSR can be realized by a smaller reproducing power, and a reproducing power margin is wider can be provided.

According to the invention, there is provided a magnetooptic recording medium in which a mark of a recording layer is reflected from an aperture sandwiched between a front mask formed ahead of a reproducing beam in a reproducing layer and a rear mask formed behind the reproducing beam, and data is reproduced by an MSR.

According to the invention, there is provided a magnetooptic recording medium in which a signal is recorded and reproduced onto/from one or both of lands and grooves which are formed alternately on the medium. Particularly, the invention is suitable for the magnetooptic recording medium in which the signal is recorded and reproduced onto/from both of the lands and the grooves.

According to the invention, there is provided a storing apparatus, wherein at least a recording layer for recording data and a reproducing layer for reproducing the data recorded in the recording layer are formed on a substrate of a magnetooptic recording medium, and the storing apparatus comprises: a reproducing unit which reproduces the recorded data by setting a proper reproducing laser power upon reproduction; and a recovery processing unit which, when a predetermined recovery condition such as read error, temperature fluctuation, or the like occurs, uniformly magnetizes magnetizing directions of a buffer area, a sector address area, and a gap area which are sandwiched between data areas in which the data is recorded in the recording direction and, thereafter, retries the reproduction.

According to the invention, there is also provided a storing apparatus, wherein at least a recording layer for recording data and a reproducing layer for reproducing the data recorded in the recording layer are formed on a substrate of a magnetooptic recording medium, and the storing apparatus comprises: a reproducing unit which reproduces the recorded data by setting a proper reproducing laser power upon reproduction; and a recovery processing unit which, when a predetermined recovery condition such as read error, temperature fluctuation, or the like occurs, uniformly magnetizes a portion just before a data area where the data is recorded in the recording direction and, thereafter, retries the reproduction. In the storing apparatus, the reproducing unit reflects a mark in the recording layer from an aperture sandwiched between a front mask formed ahead of a reproducing beam in the reproducing layer and a rear mask formed behind the reproducing beam, and reproduces the data by an MSR. Further, in the storing apparatus, the reproducing unit reproduces a signal recorded on one or both of lands and grooves which are alternately formed on the magnetooptic recording medium.

According to the invention, there is provided a magnetooptic recording medium, wherein a portion of an emboss area or a space area before or after a data area where data is magnetooptically recorded is uniformly magnetized in the recording direction. The emboss areas locating before and after the data area are emboss tins (pit trains) constructed by concave portions formed on the lands in case of the land recording, emboss trains formed with convex portions on the groove so as to have a height up to a land surface in case of the groove recording, or emboss trains of the concave portions or convex portions corresponding to each of the land recording and the groove recording in case of the land/groove recording. All of them are concave and convex emboss trains. The space area is a flat area where no data is recorded, for example, a mirror surface area or a gap area. The position before the data area denotes a range where when the laser beam is located at the boundary of the data area, the portion in this range has to function as a rear mask when it is seen from the boundary.

Further, according to the invention, there is provided a storing apparatus having a format write processing unit which uniformly magnetizes a portion before or after a data area on a magnetooptic recording medium where data is recorded in the recording direction. In a manufacturing line or the like of the magnetooptic recording medium according to the invention, this storing apparatus is used as a format writer of the medium.

The above and other objects, features, and advantages of the present invention will become more apparent from the following detailed description with reference to the drawings.

DETAILED DESCRIPTION OF THE PREFERRED EMBODIMENT

Figure 2:
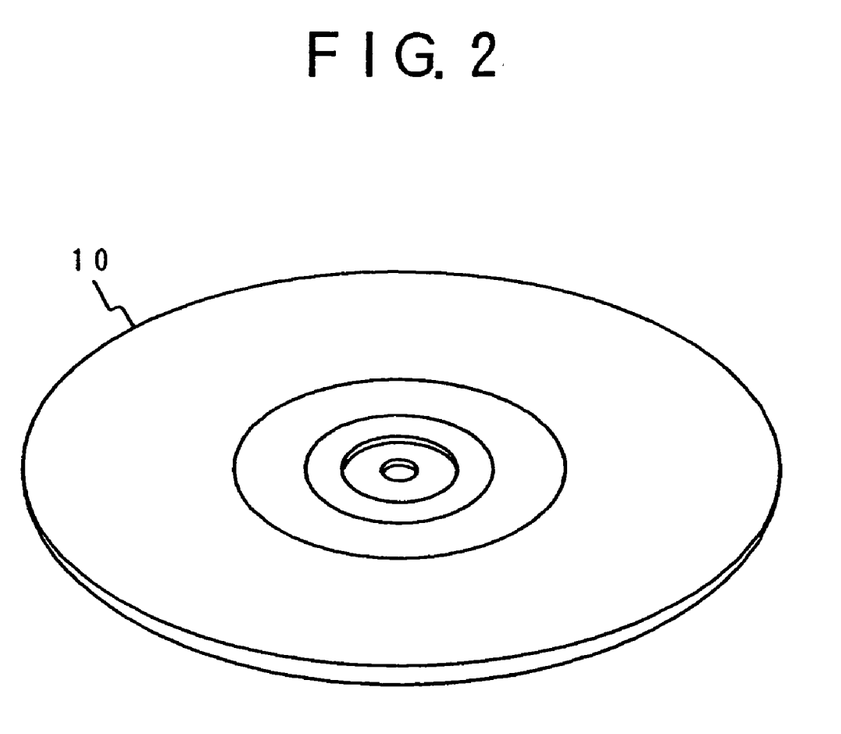
FIG. 2 is an explanatory diagram of a magnetooptic recording medium according to the invention.

FIG. 2 is an explanatory diagram showing an external view of a magnetooptic recording medium according to the invention. A magnetooptic recording medium 10 of the invention is a magnetooptic disk medium having a diameter of, for example, 90 mm, has a memory capacity of, for example, 1.3 GB, and uses an MSR technique according to a double mask, rear aperture, detection methodology.

Figure 3:
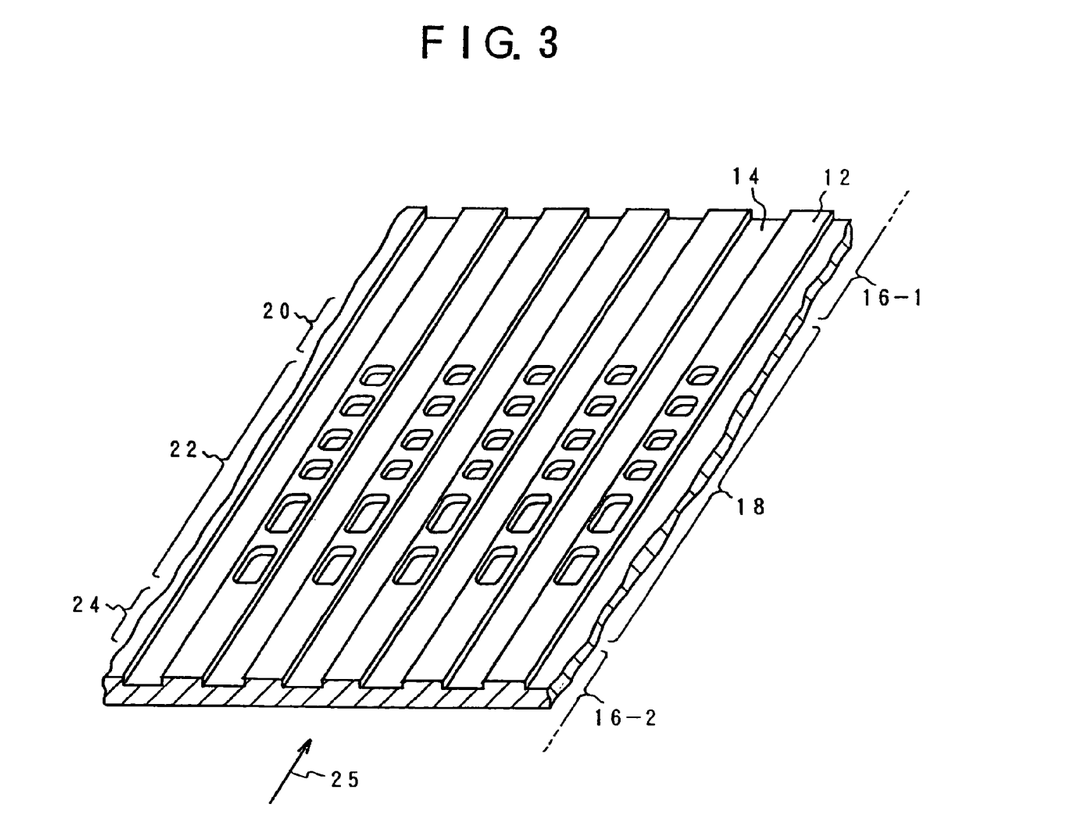
FIG. 3 is an enlarged explanatory diagram of a recording surface of an ID area in FIG. 2.

FIG. 3 is a diagram showing a medium portion including an ID area on the recording surface of the magnetooptic recording medium 10 of FIG. 2. In this medium portion, lands 12 and grooves 14 are alternately formed in the radial direction at regular intervals. ID areas 18 are formed in the circumferential direction at predetermined intervals. The ID area 18 is constructed by a buffer area 20, a sector address area 22, and a gap area 24 from the front side serving as a rotating direction. Both sides of the ID area 18 correspond to data areas 16-1 and 16-2. Pit trains are formed in the sector address area 22 in the ID area 18.

Figure 4A:
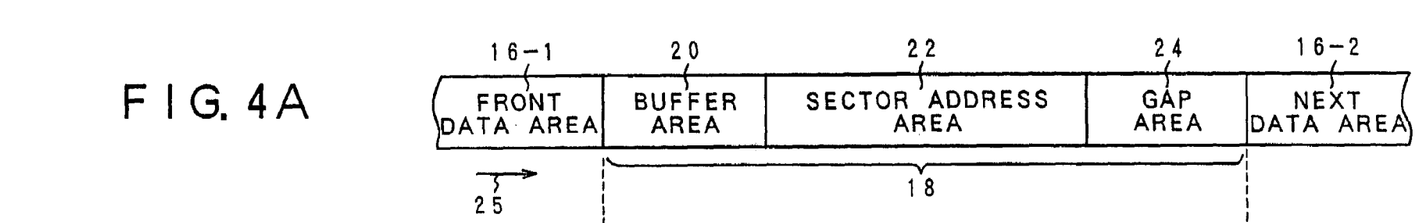
FIGS. 4A and 4B are explanatory diagrams of a medium structure in which the ID area sandwiched between data areas has been initialized in the recording direction according to the invention.
Figure 4B:
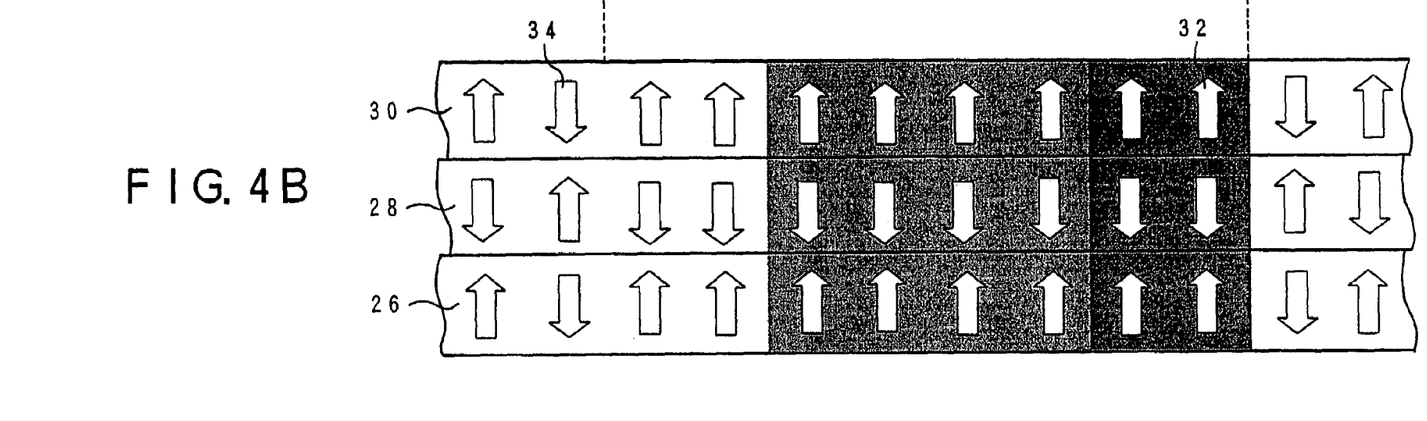

FIGS. 4A and 4B show an initial state of a medium structure according to the invention. FIG. 4A shows one track taken out from tracks in FIG. 3. The ID area 18 is formed between the data area 16-1 locating in the rotating direction and the next data area 16-2. The ID area 18 is constructed by the buffer area 20, sector address area 22, and gap area 24 in order from the front side. FIG. 4B shows a cross sectional structure of the medium comprising a recording layer 26, an intermediate layer 28, and a reproducing layer 30. The recording is performed at a recording density that is equal to or higher than a cut-off frequency. Upon reproduction, by setting a proper reproducing laser power, the data recorded at the recording density that is equal to or higher than the cut-off frequency can be reproduced by the MSR. A component construction of each layer of the magnetooptic recording medium of the invention is as follows. For example, the recording layer 26 is constructed by TB of 22 weight %, Fe of 66 weight %, and Co of 12 weight %. The intermediate layer 28 is constructed by Gd of 28 weight % and Fe of 72 weight %. Further, the reproducing layer 30 is constructed by Gd of 21 weight %, Fe of 60 weight %, and Co of 19 weight %. According to the magnetooptic recording medium of the invention, initialization of the medium is performed to a recording direction 32 just after the manufacturing. That is, a magnetic field larger than a coercive force of the medium is applied and the whole surface of the medium is magnetized to the uniform direction, namely, the recording direction 32 in the invention. According to the initialization for magnetizing the medium in the recording direction 32, a micro magnetic domain which becomes a cause of noises is eliminated. In case of the land recording medium as shown in FIG. 3, since the grooves 14 cannot be erased by a magnetooptic disk drive, the medium is initialized in the recording direction 32 at a stage just after the manufacturing. Therefore, according to the magnetooptic recording medium of the invention, when the medium is in a use state where it is set into the magnetooptic disk drive and the recording and reproduction are executed, as shown in FIG. 4B, the ID area 18 constructed by the buffer area 20, sector address area 22, and gap area 24 sandwiched between the data areas 16-1 and 16-2 where the data is recorded has been magnetized in the recording direction 32.

Figure 5A:
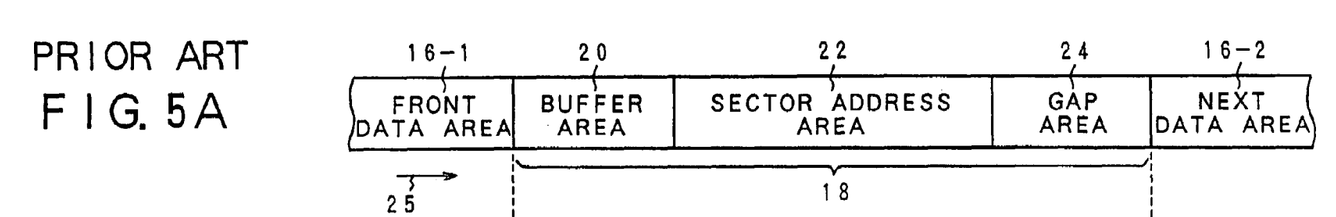
FIGS. 5A and 5B are explanatory diagrams of a conventional medium structure initialized in the erasing direction.
Figure 5B:
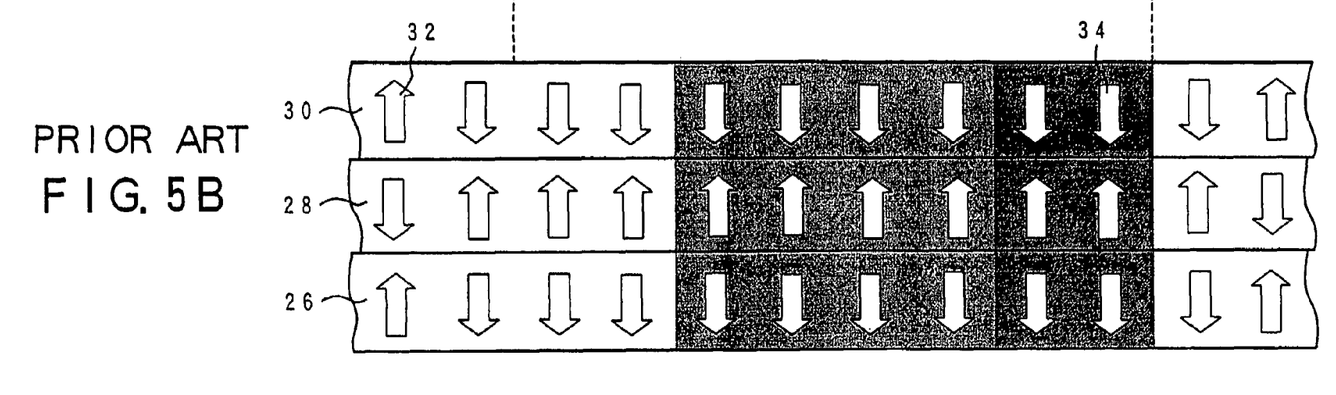

On the other hand, according to the conventional magnetooptic recording medium from which the reproduction by the MSR is performed, the medium is initialized to an erasing direction 34 just after the manufacturing of the medium as shown in FIGS. 5A and 5B. Therefore, in a recording/reproducing state of the magnetooptic recording medium, the ID area 18 existing between the data areas 16-1 and 16-2 has been magnetized in the erasing direction 34.

Figure 6A:
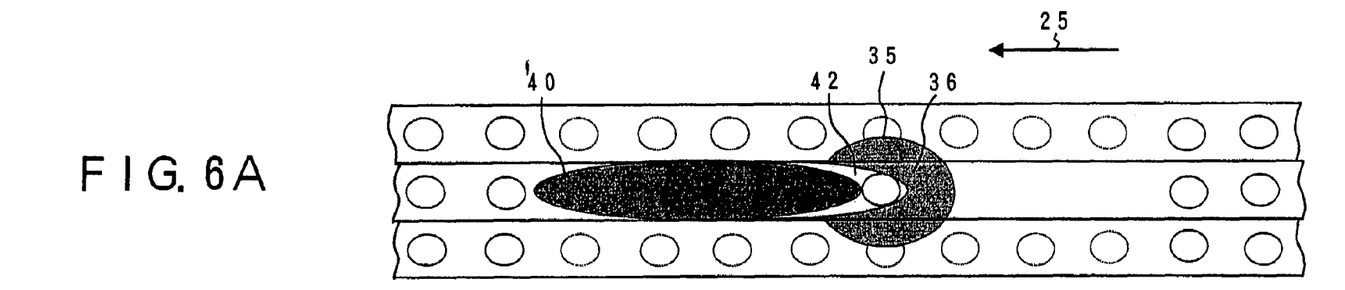
FIGS. 6A to 6C are explanatory diagrams of an MSR reproduction using the magnetooptic recording medium according to the invention.
Figure 6B:
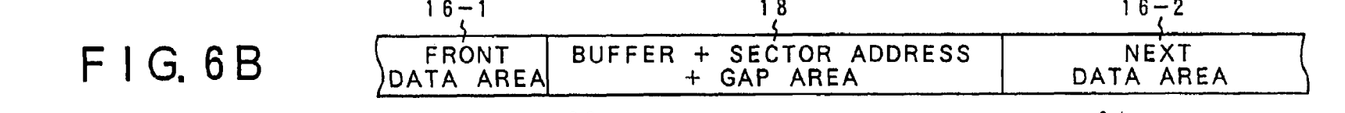
Figure 6C:
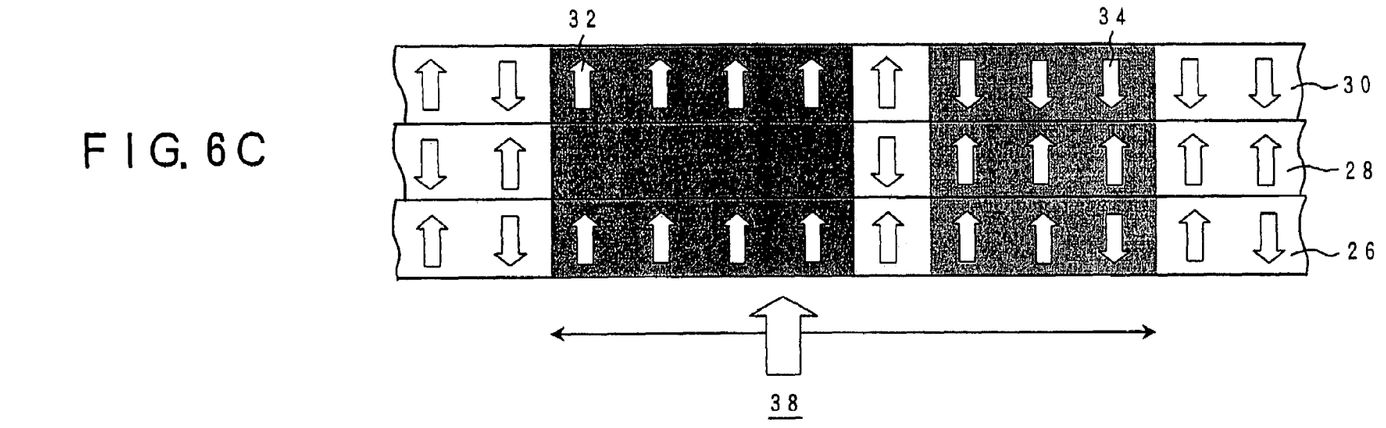

An influence which is exerted on a reproducing power margin by the magnetizing direction just before the data area will now be described. FIGS. 6A to 6C show a reproducing principle of the magnetooptic recording medium of the invention. That is, FIG. 6A shows a plan view of three tracks. FIG. 6B shows a formatting state in the tracking direction. Further, FIG. 6C shows a medium structure. In FIGS. 6A to 6C, according to the reproduction by the MSR, in a manner similar to that shown in FIGS. 1A and 1B, a recording mark is read from an aperture 42 sandwiched by a front mask 36 ahead of a laser beam 35 and a rear mask 40 behind the laser beam 35. To widen the reproducing power margin, particularly, to widen the reproducing power margin on the low power side, it is sufficient to set a magnetizing state where the aperture 42 subsequent to the front mask 36 can be easily formed.

Figure 7:
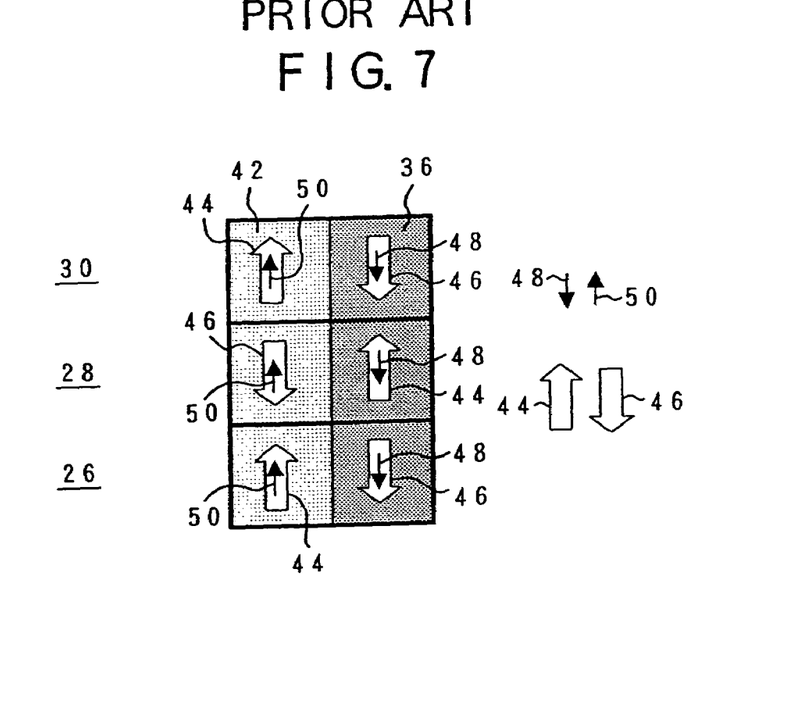
FIG. 7 is an explanatory diagram of a conventional magnetization structure of a boundary area of a front mask and an aperture of the medium initialized in the erasing direction.
Figure 8:
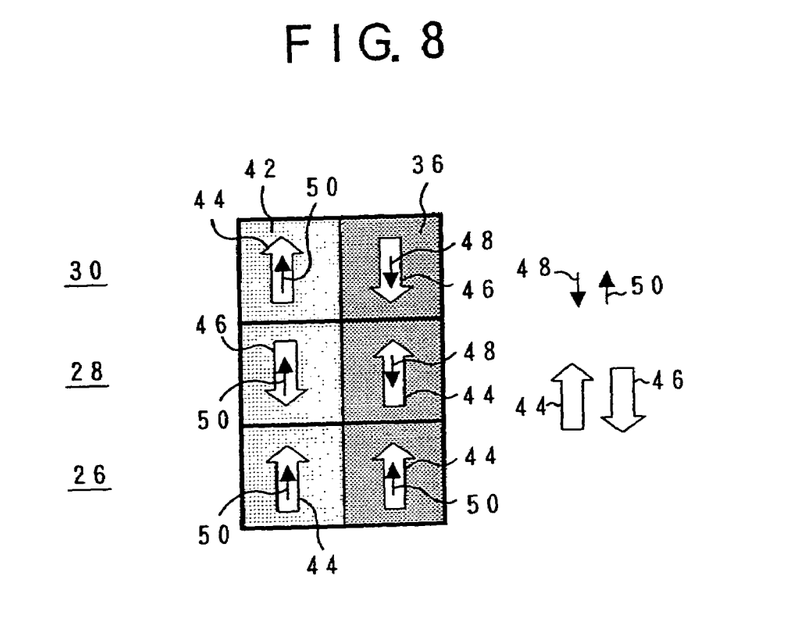
FIG. 8 is an explanatory diagram of a magnetization structure of a boundary area of a front mask and an aperture of the medium initialized in the recording direction according to the invention.

FIG. 7 shows a detailed magnetizing state regarding the conventional magnetooptic recording medium in FIGS. 5A and 5B. In correspondence to it, FIG. 8 shows details of a magnetizing state regarding the magnetooptic recording medium of the invention. In the magnetization structure of the recording layer 26, intermediate layer 28, and reproducing layer 30 in FIGS. 7 and 8, the recording layer 26 and reproducing layer 30 become TM-rich in which the greater part is occupied by the magnetizing state by transition metal TM of Fe and Co. The intermediate layer 28 becomes RE-rich in which a principal part of the magnetization structure is occupied by a rare earth. According to the conventional medium of FIG. 7, when the transition metal TM serving as a switched connection, that is, the magnetization of lead or cobalt is confirmed in the area of the front mask 36, as shown in a TM magnetizing direction 48, all of the layers of the recording layer 26, intermediate layer 28, and reproducing layer 30 are directed to the same TM magnetizing direction 48, a magnetic domain wall as a boundary between the magnetic domain of the recording layer 26 and the magnetic domain of the intermediate layer 28 does not exist, and it will be understood that the medium is in a stable state, that is, a state where the aperture 42 is hard to be formed. In FIG. 7, each of arrows 44 and 46 indicates a synthesis magnetizing direction (magnetizing direction of TM+RE) of the transition metal TM and rare earth RE. On the other hand, according to the magnetooptic recording medium of the invention in FIG. 8, when the magnetization of the transition metal TM serving as a switching connection in the area of the front mask 36 is confirmed, the magnetizing directions are different like a TM magnetizing direction 50 and the TM magnetizing direction 48 in the recording layer 26 and intermediate layer 28. Therefore, the magnetic domain is formed at the boundary between the recording layer 26 and intermediate layer 28. It will be understood that the medium is in an unstable state as compared with that of the magnetization structure of the conventional medium of FIG. 7. Therefore, at the boundary between the front mask 36 and aperture 42, the magnetizing state of the magnetooptic recording medium of the invention having the magnetizing state of FIG. 8 can more rapidly change for the temperature by the reproducing beam. Consequently, the reproducing power margin can be widened.

Figure 9:
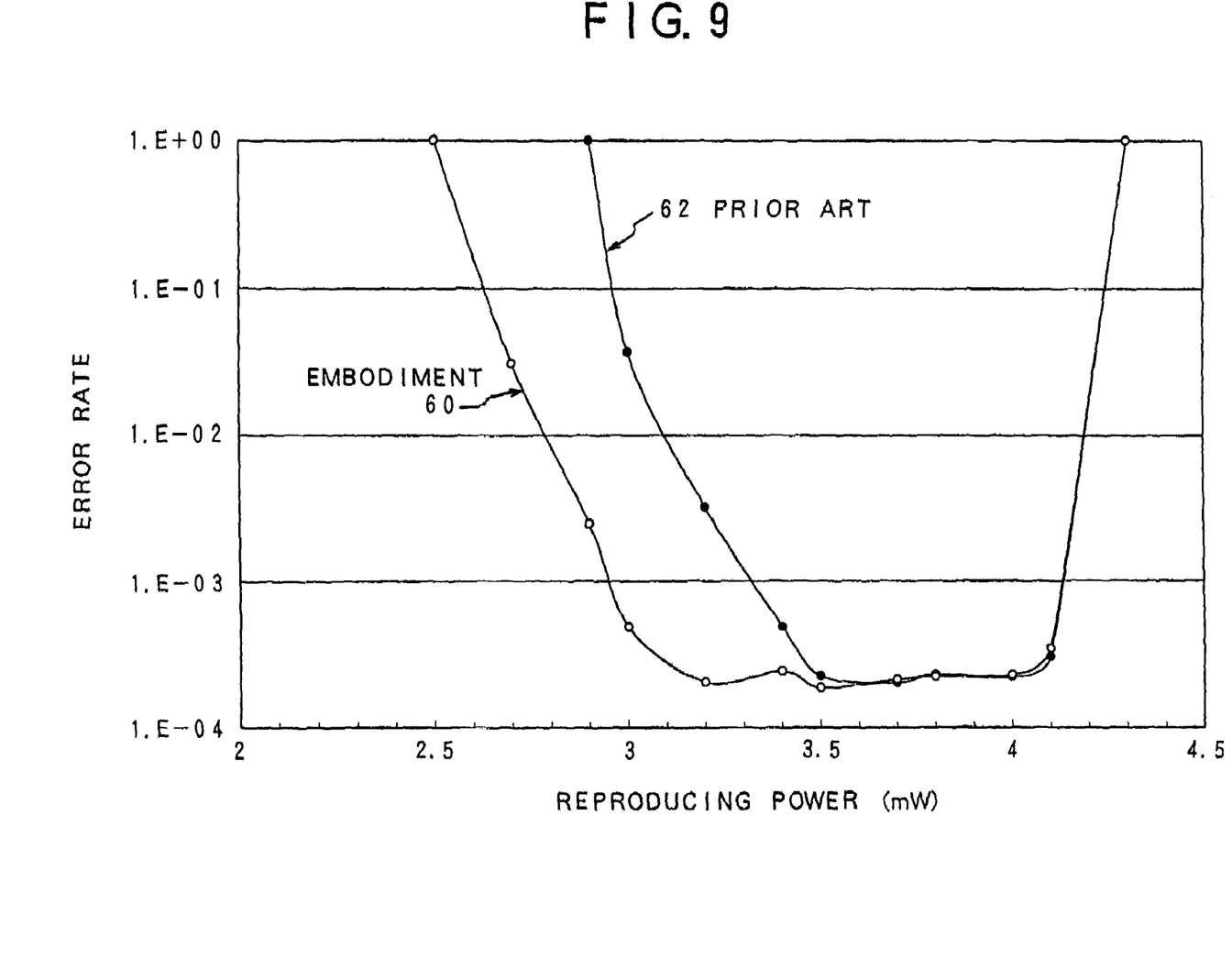
FIG. 9 is a characteristics graph showing a reproducing power margin in the magnetooptic recording medium of the invention in comparison with that of a conventional medium.

FIG. 9 shows the reproducing power margin of the magnetooptic recording medium of the invention in comparison with that of the conventional medium. A power margin 60 in the invention is widened toward the low power side from a reproducing power margin 62 of the conventional medium by about 0.5 mw. It can be confirmed that the reproducing power margin has been widened by initializing the ID area sandwiched by the data areas in the recording direction.

Figure 10:
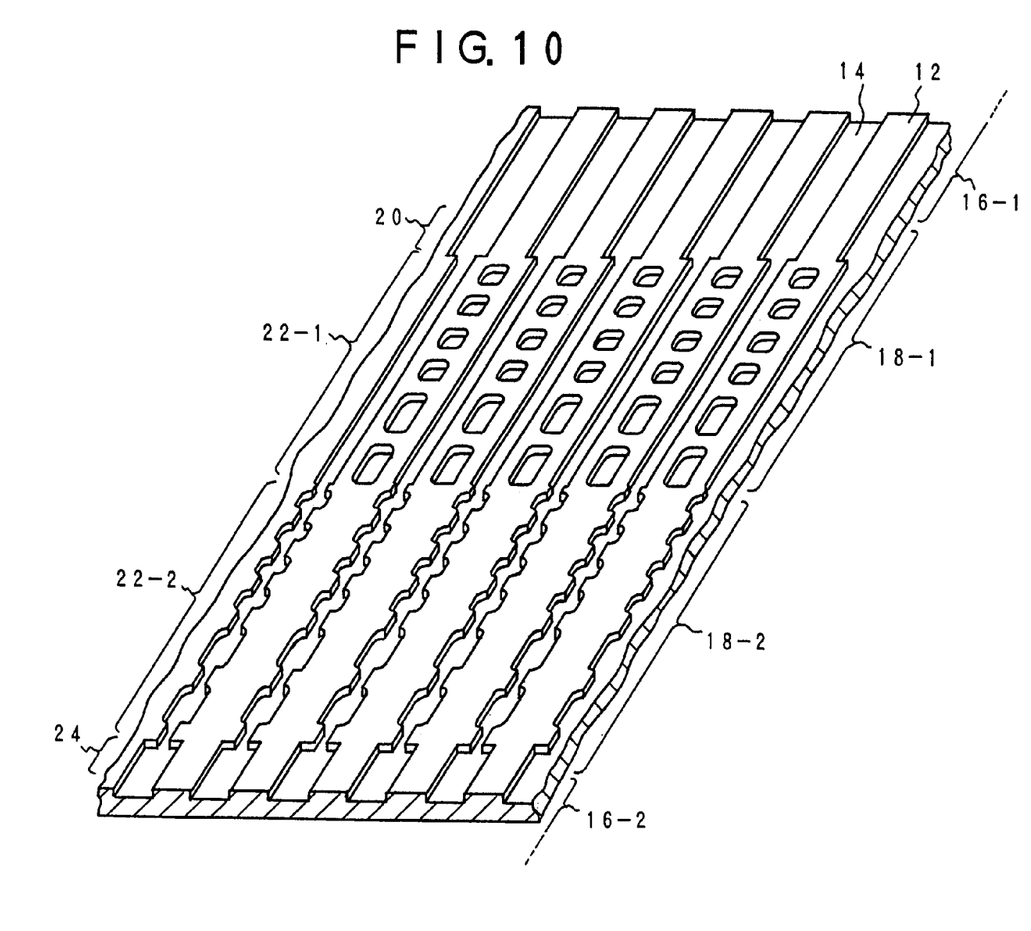
FIG. 10 is an explanatory diagram enlargedly showing an ID area where the land/groove recording according to the invention has been performed.

FIG. 10 is an explanatory diagram showing an ID area with respect to another embodiment of the magnetooptic recording medium according to the invention. In an embodiment, a land/groove magnetooptic disk medium for performing the recording to both of the lands and the grooves will be described as an example. According to the land/groove magnetooptic recording medium, since data is recorded and reproduced to/from both of the lands 12 and grooves 14, the ID area sandwiched by the data areas 16-1 and 16-2 is constructed by: a land ID area 18-1 where pits have been formed on the lands 12; and a groove ID area 18-2 where pits have been formed on the grooves 14. A detailed structure of the land ID area 18-1 and groove ID area 18-2 will now be described. A land sector address area 22-1 is provided after the buffer area 20. Subsequently, a groove sector address area 22-2 is formed. Further, the gap area 24 is provided. Even in case of such a land/groove magnetooptic recording medium, by applying a magnetic field larger than a coercive force of the medium obtained just after the manufacturing of the medium as shown in FIGS. 4A and 4B, the whole surface of the medium is uniformly magnetized in the recording direction. Thus, even in the magnetooptic recording medium of FIG. 10 in which data is recorded to both of the lands and the grooves, the reproducing power margin can be widened toward a low power side like a reproducing power margin 60 according to the invention as compared with the conventional reproducing power margin 62 as shown in the characteristic graph of the reproducing power margins in FIG. 9. With respect to the enlargement of the reproducing power margin as mentioned above, in case of the land/groove magnetooptic recording medium in which the signal can be stored on the lands and grooves in FIG. 10, it is influenced more easily by crosstalks at the high reproducing power and there is a limitation such that a large reproducing power cannot be obtained. There is, consequently, a tendency such that the reproducing power margin is narrower than that of the medium in which the signal is recorded only onto the lands as shown in FIG. 3. Thus, the initialization in the recording direction according to the invention provides a larger effect if it is applied to the land/groove magnetooptic recording medium as shown in FIG. 10.

Further, in the above embodiment, although the whole ID area including the buffer area, sector address area, and gap area other than the data areas has been magnetized in the recording direction, with respect to the improvement of the reproducing power margin according to the invention, if the magnetizing state of the portion just before the data area 16-2 in FIGS. 3 and 10 is set in the recording direction, an enough effect of enlarging the reproducing power margin toward the low power side as shown in FIG. 9 can be derived.

Figure 11A:
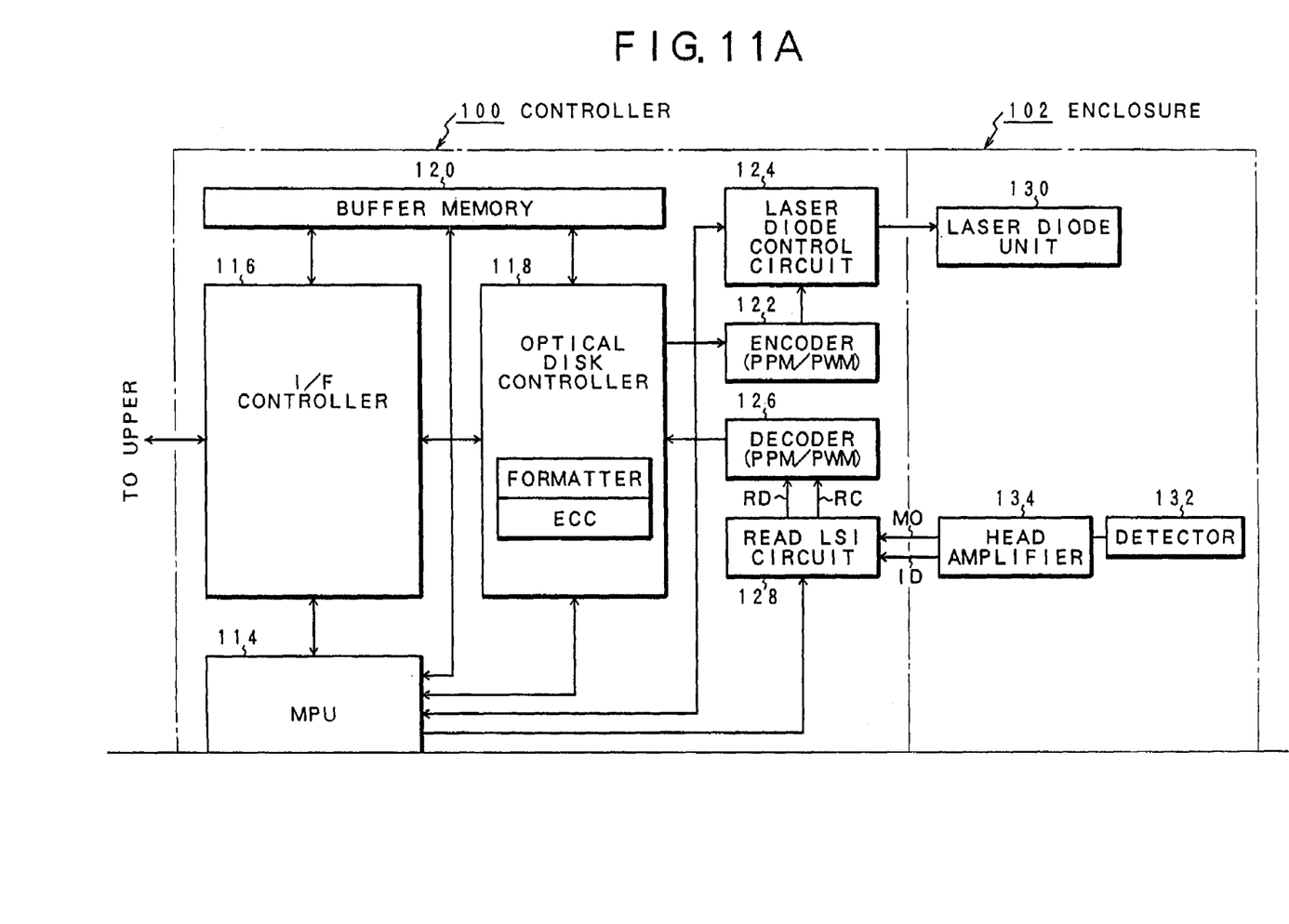
FIGS. 11A and 11B are block diagrams of a storing apparatus according to the invention.
Figure 11B:
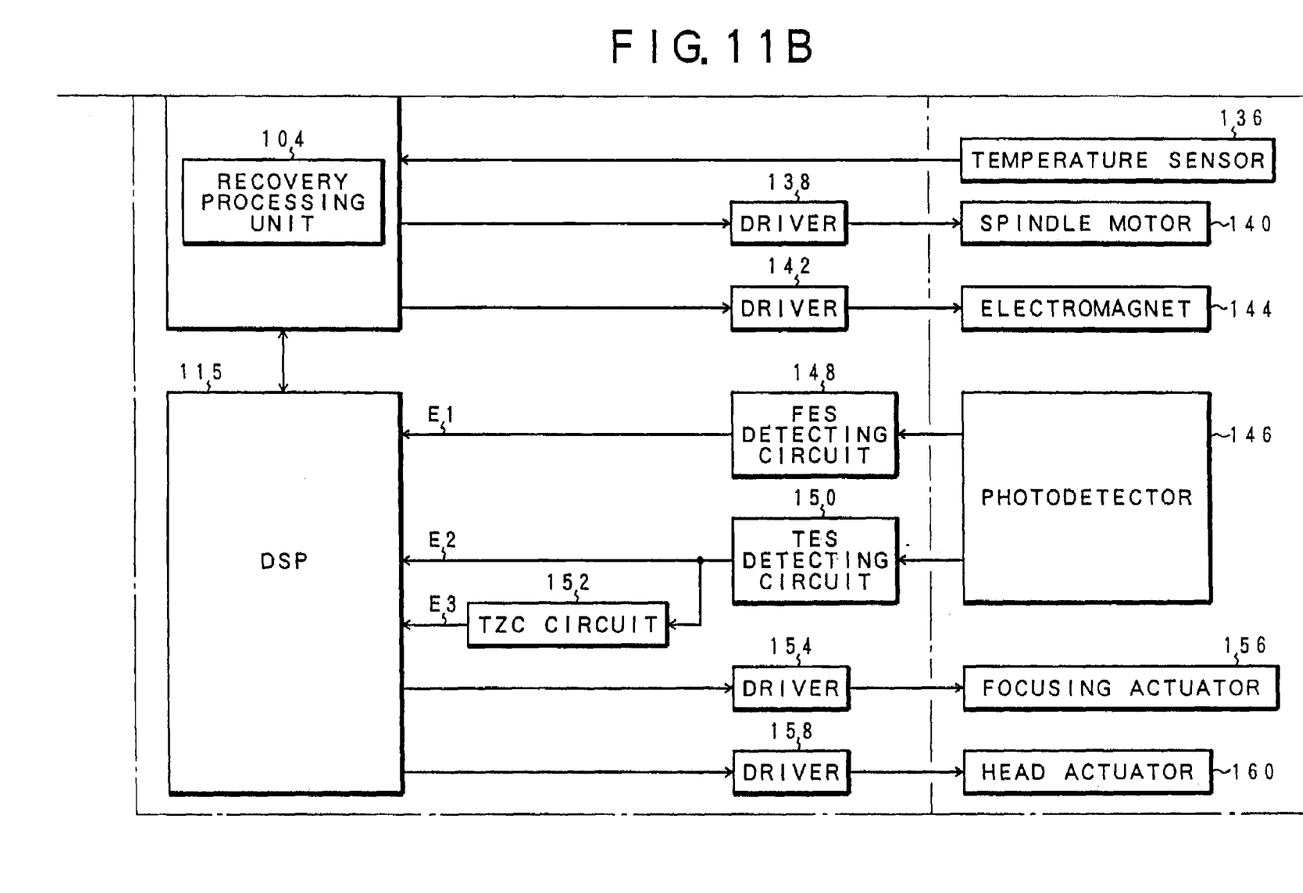

FIGS. 11A and 11B are block diagrams of an optical disk drive as a storing apparatus of the invention. A magnetooptic disk (MO) cartridge is used as an example of the magnetooptic recording medium. The optical disk drive is a drive which can perform the recording and reproducing by using the lands, lands/grooves, or grooves of the medium and constructed by a controller 100 and an enclosure 102. The controller 100 has: an MPU 114 for performing a whole control; an interface controller 116 for performing transmission and reception of data to/from a host; an optical disk controller (ODC) 118 having a formatter and an ECC function which are necessary for reading and writing of the medium; and a buffer memory 120. As a writing system, an encoder 122 is provided for the optical disk controller 118. As a reading system for the ODC 118, a detector 132, a head amplifier 134, a read LSI circuit 128, and a decoder 126 are provided. Further, a laser diode control circuit 124 and a laser diode unit 130 are provided. The detector 132 receives return light from the magnetooptic disk and outputs an ID signal and an MO signal to the read LSI circuit 128 through the head amplifier 134. The read LSI circuit 128 forms a read clock and read data from the inputted ID signal and MO signal and outputs them to the decoder 126. An environmental temperature in the apparatus detected by a temperature sensor 136 is inputted to the MPU 114. A light emitting power in the laser diode unit 130 is optimized on the basis of the environmental temperature. Further, the MPU 114 controls a spindle motor 140 through a driver 138 and controls an electromagnet 144 through a driver 142. The electromagnet 144 supplies an external magnetic field upon recording and sure using the MO cartridge. In case of a magnetically induced super resolution magnetooptic medium (MSR medium) in the MO cartridge of 1.3 GB, the external magnetic field is also supplied upon reproduction. A DSP 115 performs a servo control for positioning an objective lens mounted in a head actuator to a target position on the magnetooptic disk on the basis of a servo error signal. The servo control has two functions of a tracking control for positioning the objective lens to the target track position on the medium and a focusing control for controlling the objective lens to a focal position on the medium. In correspondence to the servo control, a photodetector 146, a focusing error signal detecting circuit (FES detecting circuit) 148, a tracking error signal detecting circuit (TES detecting circuit) 150, and a track zero-cross point detecting circuit (TZC detecting circuit) 152 are provided. The FES detecting circuit 148 forms a focusing error signal by, for example, a knife edge method as a focusing optical system. The DSP 115 drives a focusing actuator 156 by a driver 154 with respect to the focusing control, thereby positioning the objective lens to the focal position in the optical axial direction. With respect to the tracking control, the DSP 115 drives a head actuator 160 using a VCM by a driver 158, thereby positioning the objective lens to a target track center on the medium.

A recovery processing unit 104 is provided for the MPU 114. A formatting operation for initializing the ID area of the magnetooptic recording medium in the recording direction is executed and the reproducing power margin is enlarged, thereby coping with the read error or fluctuation of the temperature in the apparatus.

Figure 12:
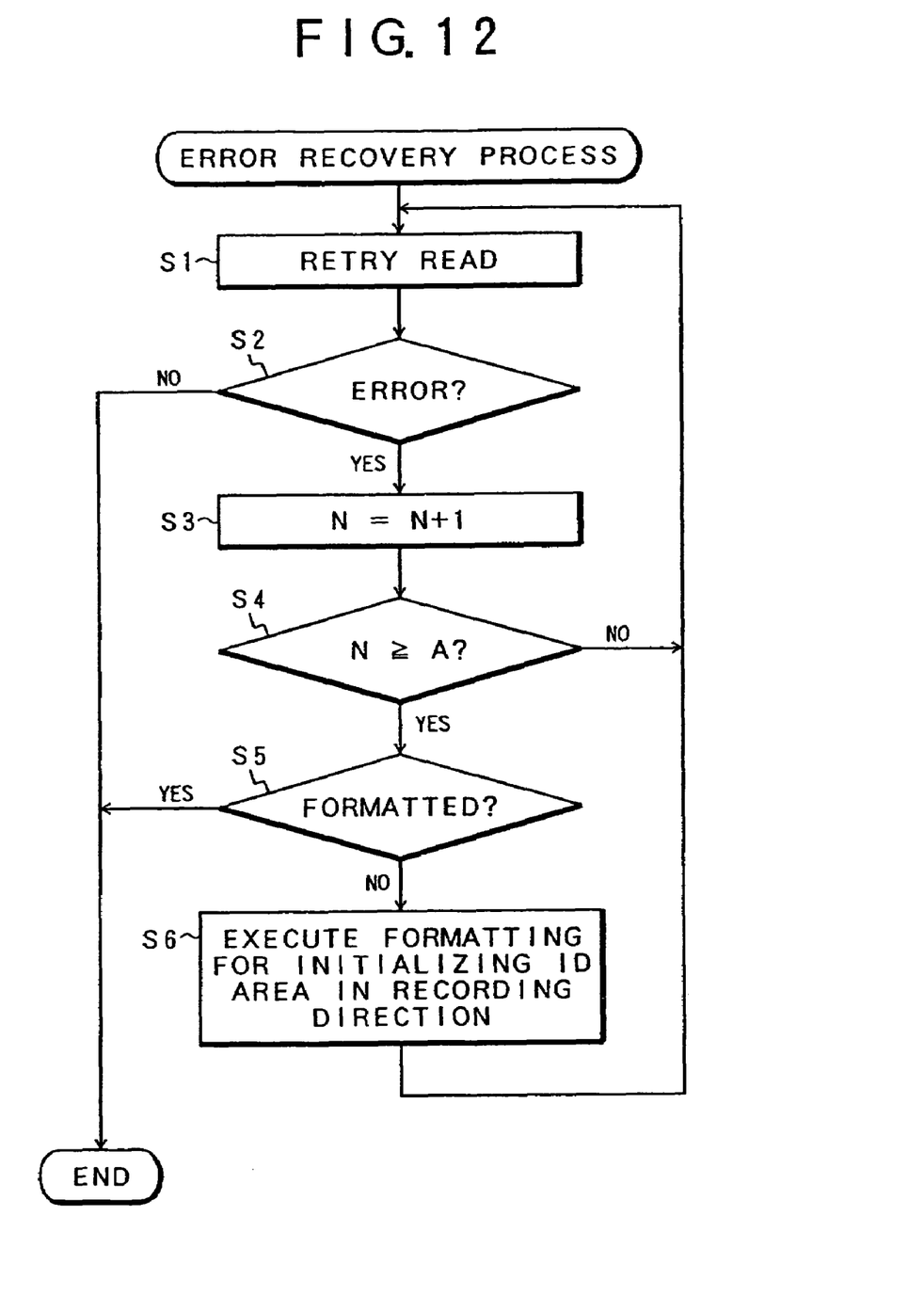
FIG. 12 is a flowchart for a recovery process for a reproduction error according to the storing apparatus in FIGS. 11A and 11B.

FIG. 12 is a flowchart for an error recovery process upon reproduction in the case where a magnetooptic recording medium in which the ID area between the data areas has been initialized in the recording direction according to the invention is used in the magnetooptic disk drive in FIGS. 11A and 11B. The error recovery process is made operative when a read error is caused due to the reproduction by the MSR. First, in step S1, a retry read (retry reading operation) is executed. If the error occurred due to the retry read in step S2, a count value of a counter N is increased by "1" in step S3. After that, whether the count value of the retry counter N has reached the number (A) of retry times or not is discriminated in step S4. The retry counter N is set to N=0 in the initial state. If the count value of the retry counter N is not equal to the predetermined value (A) in step S3, the processing routine is returned to step S1 and the retry read is repeated again. If the number of times of the retry read reaches the predetermined value (A), step S5 follows and whether formatting has been finished or not is discriminated. If NO, step S6 follows and the formatting to initialize the ID area on the magnetooptic recording medium in the recording direction is executed. The ID area just before the data area is initialized in the recording direction by the formatting for initializing the ID area in the recording direction in step S6, and a magnetizing state where the aperture 42 subsequent to the front mask 36 can be easily formed as shown in FIG. 7 is formed, so that the reproducing power margin on the low power side is enlarged. Therefore, the processing routine is returned to step S1 and the retry read is executed again. Thus, the reproduction in which the error has occurred so far enters a state of the successful read owing to the enlargement of the reproducing power margin. The error recovery can be completed. As a magnetooptic recording medium to which the error recovery process in FIGS. 11A and 11B is executed, when the read error occurred with respect to the conventional magnetooptic recording medium in which the ID area has already been initialized in the erasing direction at the stage of manufacturing, by executing the error recovery process in FIGS. 11A and 11B, a proper recovery can be accomplished. Even in case of the magnetooptic recording medium according to the invention in which the ID area has already been initialized in the recording direction, the formatting to initialize the ID area in the recording direction is executed again as an error recovery, so that the initialization in the recording direction is updated and by returning the reproducing power margin to the initial state, a possibility of the error recovery is raised.

Figure 13:
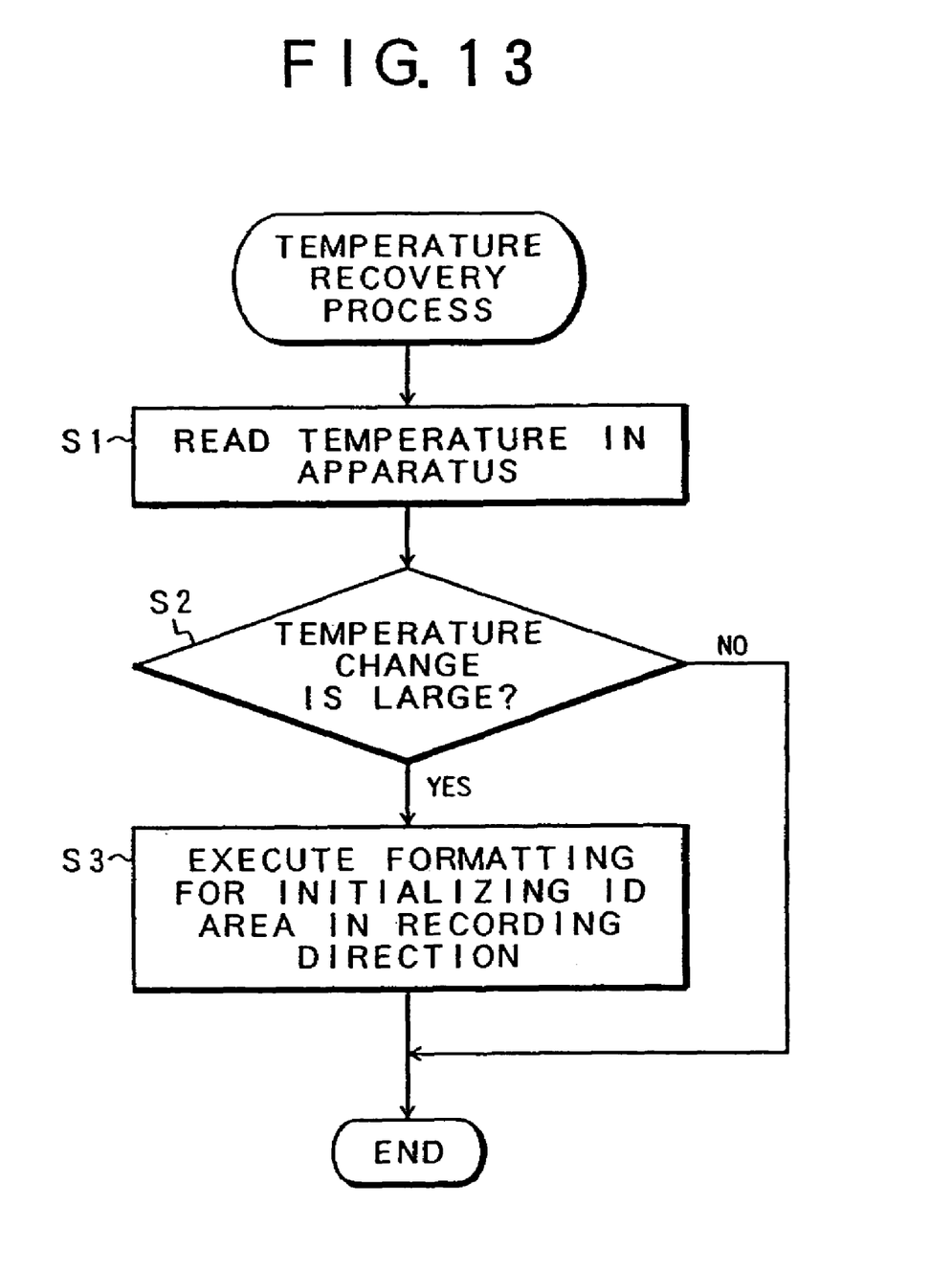
FIG. 13 is a flowchart for a temperature recovery process according to the storing apparatus in FIG. 12.

FIG. 13 is a flowchart for a temperature recovery process by the magnetooptic disk drive in FIGS. 11A and 11B. In the magnetooptic recording medium according to the invention, when a sudden fluctuation in medium temperature accompanied by an internal temperature of the drive occurs, the optimum conditions due to the reproducing power and the reproducing magnetic field which have been optimized on the basis of temperature conditions so far are broken and the read error occurs. Therefore, in the temperature recovery process in FIG. 13, the temperature in the apparatus is read in step S1 in accordance with a predetermined time schedule. Whether a temperature change is large or not is discriminated in step S2 from a temperature difference between the previous temperature in the apparatus and the present read temperature in the apparatus. If the temperature change is large, step S3 follows. The formatting to initialize the ID area on the magnetooptic recording medium in the recording direction is executed, thereby enlarging the reproducing power margin. Further, besides the formatting to initialize the ID area on the recording medium in the recording direction such as error recovery process in FIG. 12 or temperature recovery process in FIG. 13, it is also possible to execute a formatting for initializing the ID area in the recording direction in the formatting process of the magnetooptic recording medium.

According to the invention as mentioned above, the buffer area, sector address area, and gap area sandwiched between the data areas or the portion just before the data area are/is uniformly magnetized in the recording direction, so that the medium enters a state where the aperture and the rear mask can be formed more easily at the head position of the data area. The medium in which even at the head of the data area of small preheating, the reproduction by the MSR can be realized by the smaller reproducing power and the wider reproducing power margin is obtained can be provided.

When the recovery condition such as read error, fluctuation of the temperature in the apparatus, or the like occurs in the storing apparatus, by executing the initialization formatting for uniformly magnetizing the buffer area, sector address area, and gap area sandwiched between the data areas or the portion just before the data area in the recording direction, the reproducing power margin at the head of the data area which becomes a cause of errors can be widened. The recovery of performance of the apparatus against the error or temperature fluctuation can be more certainly performed.

Although the above embodiment has been described with respect to the magnetooptic recording medium of the land recording such that the signal is recorded onto the lands 12 as shown in FIG. 3, the invention can be also similarly applied to the land/groove recording medium in which the signal is recorded on both of the lands 12 and grooves 14 in FIG. 10 and, further, to the groove magnetooptic recording medium in which the signal is recorded on the grooves 14.

The ID area on the medium of FIG. 3 or 10 is not limited to that in the embodiment but can be also replaced with an emboss train comprising the concave portions of an arbitrary shape formed on the lands in case of the land recording, an emboss train comprising the convex portions of an arbitrary shape formed on the grooves so as to have a height to the land surface in case of the groove recording, and further, an emboss train comprising the concave or convex portions corresponding to each of the lands and grooves in case of the land/groove recording.

The emboss areas are optical reproducing areas for optically reproducing the signal while the data area is a magnetooptic reproducing area for magnetooptically reproducing the signal.

As another embodiment of the optical disk drive in FIGS. 11A and 11B, the functions as a format writer which is used in the manufacturing line of the magnetooptic recording medium of the invention can be also realized. The functions as a format writer are realized as a format processing unit by executing a program of the MPU 114 provided also for the controller 100 in FIGS. 11A and 11B. The front or rear portion of the data area on the magnetooptic recording medium where the data is recorded is uniformly magnetized in the recording direction. The invention incorporates proper modifications without losing the objects and advantages of the invention. Further, the invention is not limited by the numerical values shown in the above embodiment.

What is claimed is:

1. A storing apparatus, wherein
at least a recording layer for recording data and a reproducing layer for reproducing the data recorded in said recording layer are formed on a substrate of a magnetooptic recording medium, and
said storing apparatus comprises:
a reproducing unit which reproduces the recorded data by setting a proper reproducing laser power upon reproduction; and
a recovery processing unit which, when a predetermined recovery condition occurs, uniformly magnetizes magnetizing directions of a buffer area, a sector address area, and a gap area, which are sandwiched between successive data areas in which the data is recorded, in a recording direction for said reproducing layer and said recording layer and, thereafter, retries the reproduction.

2. An apparatus according to claim 1, wherein said reproducing unit reflects a mark in said recording layer from an aperture sandwiched between a front mask formed ahead of a reproducing beam in said reproducing layer and a rear mask formed behind the reproducing beam and reproduces the data by an MSR (Magnetically Induced Super Resolution).

3. An apparatus according to claim 1, wherein said reproducing unit reproduces a signal recorded on one or both of lands and grooves formed alternately on said magnetooptic recording medium.

4. A storing apparatus, wherein
at least a recording layer for recording data and a reproducing layer for reproducing the data recorded in said recording layer are formed on a substrate of a magnetooptic recording medium, and
said storing apparatus comprises:
a reproducing unit which reproduces the recorded data by setting a proper reproducing laser power upon reproduction; and
a recovery processing unit which, when a predetermined recovery condition occurs, uniformly magnetizes a front portion of a data area, in which the data is recorded, in a recording direction for said reproducing layer and said recording layer and, thereafter, retries the reproduction.

5. An apparatus according to claim 4, wherein said reproducing unit reflects a mark in said recording layer from an aperture sandwiched between a front mask formed ahead of a reproducing beam in said reproducing layer and a rear mask formed behind the reproducing beam and reproduces the data by an MSR (Magnetically Induced Super Resolution).

6. An apparatus according to claim 4, wherein said reproducing unit reproduces a signal recorded on one or both of lands and grooves formed alternately on said magnetooptic recording medium.

7. An apparatus according to claim 1, wherein said predetermined recovery condition is at least one of a read error and a temperature fluctuation.

8. An apparatus according to claim 4, wherein said predetermined recovery condition is at least one of a read error and a temperature fluctuation.

* * * * *